United States Patent [19]

Rabek

[11] Patent Number: 5,343,974

[45] Date of Patent: Sep. 6, 1994

[54] AN ELECTRICALLY POWERED MOTOR VEHICLE

[76] Inventor: Jan W. Rabek, 2150 Patricia Ave., Los Angeles, Calif. 90025

[21] Appl. No.: 911,928

[22] Filed: Jul. 10, 1992

[51] Int. Cl.$^5$ .................. B62D 61/08; B60K 1/02; B60G 3/12
[52] U.S. Cl. .................. 180/216; 180/217; 180/65.1; 180/357; 180/170; 280/701
[58] Field of Search .............. 180/59, 60, 68.5, 216, 180/217, 357, 371, 373, 170, 65.1, 292, 297; 280/690, 701

[56] References Cited

U.S. PATENT DOCUMENTS

| | | | |
|---|---|---|---|
| 2,507,980 | 5/1950 | Knapp | 280/701 |
| 3,175,637 | 3/1965 | Honda | 180/357 X |
| 3,294,190 | 12/1966 | Suvor et al. | 180/216 |
| 3,847,242 | 11/1974 | Kappei | 180/68.5 |
| 3,908,776 | 9/1975 | Dudley . | |
| 3,930,552 | 1/1976 | Kunkle et al. | 180/68.5 |
| 3,955,639 | 5/1976 | Cragg . | |
| 3,989,118 | 11/1976 | Hansen | 180/68.5 |
| 4,527,648 | 7/1985 | Sines et al. . | |
| 4,538,695 | 9/1985 | Bradt . | |
| 4,566,709 | 1/1986 | Sano | 180/170 X |
| 4,570,739 | 2/1986 | Kramer . | |
| 4,570,741 | 2/1986 | McCoy . | |
| 4,606,429 | 8/1986 | Kurata | 180/373 X |
| 4,613,151 | 9/1986 | Kielczewski . | |
| 4,726,459 | 2/1988 | Vos . | |
| 4,805,712 | 2/1989 | Singleton | 180/65.1 |
| 4,977,970 | 12/1990 | Steiger . | |
| 5,064,013 | 11/1991 | Lenz . | |
| 5,067,932 | 11/1991 | Edwards . | |

FOREIGN PATENT DOCUMENTS

| | | | |
|---|---|---|---|
| 3044899 | 6/1982 | Fed. Rep. of Germany | 180/217 |
| 972290 | 1/1951 | France | 180/216 |
| 1132350 | 3/1957 | France | 180/373 |

OTHER PUBLICATIONS

B. A. Johns and D. D. Edmundson, *Motorcycles Fundamentals, Service, Repair*, The Goodheart-Wilcox Company, Inc. (Publ.) South Holland, Ill., pp. 21, 324, 1991.

*Primary Examiner*—Brian L. Johnson
*Attorney, Agent, or Firm*—Merchant & Gould

[57] ABSTRACT

A motor vehicle including modular units for operating two rear wheels of the vehicle the motive unit includes a rigid link which is pivotally connected between the rear wheel and the motive unit, and the motive unit is operable by a motor. A rigid link is pivotally connected, and the rear wheels are spring suspended mounted relative to the frame of the vehicle. In an electrical vehicle form, there is a slidable movable battery pack located in a rear compartment of the vehicle for easy installation and removal from the vehicle. Different traction characteristics can be provided to the motive unit including an integrated motor, integrated gear box, and power input-output shaft accessible to secondary power or an energy recycler unit. Steering is effected by a controller which operates the speed of the driven wheels.

7 Claims, 6 Drawing Sheets

AN ELECTRICALLY POWERED MOTOR VEHICLE

BACKGROUND

This invention relates to the field of motor vehicles such as automobiles, introducing a concept of modular construction where self-contained, multi-functional, structural units provide building blocks in the vehicle assembly. In particular, the invention is directed to electric vehicles using battery power or a battery and an external power supply. More so the invention concerns specialized vehicles designed to perform specific functions.

The present art in this field is highly developed and well represented by the conventional automobile. Until recent years, the automobile status was accepted without any serious reservations. However, in the process of development, some features such as efficiency were neglected, while others such as size and weight had a tendency to grow.

Presently, almost all motor vehicles depend on internal combustion engines as their source of power. This is also the source of two serious problems: dependence on an unstable and expensive supply of fuel, and the more serious problem of air pollution. The latter problem causes ever-growing restrictions on the use of internal combustion engines, forcing the industry to produce less polluting cars or to turn to production of electric vehicles.

This invention addresses both of these problems by enabling vehicle designers and manufacturers to produce less expensive and more efficient vehicles than the internal combustion engine, and, moreover, to produce an electrical vehicle with a potential to equal and surpass performance and utility of the present day automobiles.

Primarily, the invention seeks to provide a commuter and general utility vehicle with reduced weight, improved performance and low production cost.

SUMMARY

According to the invention a motor vehicle comprises a frame, means on the frame for accommodating a load which is selectively one or more passengers. The vehicle includes at least three wheels supported by the frame and there is motive means for driving two of the wheels. A power source is supported by the frame.

The motive means is located relative to the driven means such that there is a relative pivotal movement between the driven wheels and the motive means. A rigid mechanical link between the motive means and the driven wheels are pivotally mounted relative to the motive means and pivotally mounted relative to the driven wheels. As the wheels move vertically, the link moves vertically about the pivot mounting of the motive means and the driven wheels. There is drive means for transmitting power between the motive means and the wheels whereby the wheels can apply a traction force to a surface on which the vehicle moves.

In a preferred form of the invention, the drive means is a flexible drive in a selectively chained belt.

In a further preferred form of the invention the rigid link about the wheel includes suspension means, the suspension means being anchored at one end with the rigid link and another end with the frame of the vehicle.

The motive means includes an electric motor or I.C. engine located selectively in adjacency with the motive means or as an integral part of the motive means. The motor can selectively include a gear box and a power take off shaft.

The motive means permits for means for controlling the steering of the vehicle. The essential components of power generation, suspension, gearing and steering requires structure of substantially or relatively less weight than in conventional vehicle driven by an internal combustion (I.C.) engine.

Reduction of the excess weight encountered in conventional cars improves performance, lowers fuel consumption and reduces the amount of polluting emissions. This is achieved by eliminating the conventional power train components, front and rear suspension system and braking and steering systems. With the invention, the functions of all these presently indispensable components including traction wheel and brakes are combined within two substantially identical compact modules.

Another aspect of the invention is the removal of heavy and bulky parts from the body frame of the vehicle. This relieves structural stresses and allows lighter construction to provide more space for safety and comfort for the driver and passengers.

Manufacturing savings are expected to result from the modular design of the vehicle and reductions in weight. Modules for assembly will be channeled to a network of assembly points such as repair shops at gas stations or battery stations, large scale factories with expansive intricate assembly lines may be unnecessary.

An essence of the invention is the design of traction modules, namely a Basic Traction Module, a Reducing Traction Module, a Power Traction Module and a Compound Traction Module, each module providing for different design purposes and requirements of the vehicle.

Most of the advantages and benefits coming from this invention are conferred to the electrical vehicle, and components of that vehicle and the method of operating these components and the method of generating power for that vehicle.

In the advanced version of such vehicle, there is an electric motor with an associated gear reducer added to the Basic Traction Module. This creates a complete self-contained Power Traction Module, in some respects similar to the outboard motor in a boat. Such power traction modules considerably simplify design and construction, by removing all parts of the power train from the vehicle body.

In the further advanced form of this invention, the Compound Power Traction Module has a shaft concentric with the module pivot for additional power input or output for the energy storage and recycling system, or for the addition of extra power from an auxiliary power source in a hybrid model. Also, provisions are made for the optional access for the mechanical and electrical controls if a multi-speed or a free-wheel drive is requested.

Another characteristic of this invention is alleviation of dependence of the electric vehicle on the capacity of its batteries. The accessibility of a removable battery pack located low between the two power traction modules allows easy replacement of the depleted battery pack with a charged pack at a gas-battery station. The vehicle contains means for facilitating replacement of a battery pack, the battery pack being slidably mounted on support means in the vehicle. Removal of the battery is effected by rolling the battery from the vehicle to an adjacent support carriage. Replacing a recharged battery is effected by rolling the new battery from an adjacent carriage into the vehicle. This process of replenishing energy will be cheaper and will take no more time than filling a gasoline tank for the equivalent milage. Once a network of battery supply stations is established, or when the gas stations add this function to their operation, this feature, with respect to the operating range, will place the electric vehicle on equal footing with a conventional I.C. automobile.

The invention also takes advantage of two motors in the vehicle and uses a series-parallel control. Under this arrangement the two motors are electrically connected in series when the vehicle starts and is later changed to a parallel connection to provide maximum speed. This general type of series-parallel control is a basic advantage over single motor design.

Other invented features include a vehicle having maneuverability at zero or low turning radius, and the capability of riding over extremely rough terrain. The vehicle can be designed to have an amphibious capability, steerable and operable on land and/or water. Such a vehicle would serve the purpose of rescue vehicles, military and ranger operations, and recreational vehicles. Due to the fact that two traction wheels carry most of the load, they are practically as effective as the "four-wheel drive" in a "Jeep" (Trademark) or similar terrain vehicle.

Flexible geometry of the vehicle, such as adjustable distance between the traction wheels and adjustable elevation of the frame with respect to the ground, is applicable in agricultural machines such as sowing and harvesting machines operating back and forth in the field over parallel rows of sown or harvested crops.

In some applications of the special vehicle, it may be prudent to replace electric motors in the Power Traction Module or Compound Traction Module with the advanced internal combustion engines possibly having ignition controlled speed in order to accomplish differential steering control similar to one performed with two electric motors.

Also, the electric power vehicle is made compatible with a transportation system having an external power supply. With the expansion of electric transportation, freeways and highways will gradually be electrified and be made accessible to vehicles operating on their own battery power. The invention provides a retractable receptacle which can slide over bus bars, rails or other means which need to use external power. A switching system and a meter records power used for driving and charging the batteries. The vehicle is also adaptable to the system of underground power supply lines.

The invention is further described with reference to the accompanying drawings.

DESCRIPTION

A modular vehicle design incorporates elements of traction, suspension and steering. These elements, including traction wheels and brakes, are incorporated in two self-contained assemblies of traction modules which are symmetrically located on the opposite sides of a vehicle to support the bulk of the vehicle weight and provide traction and steering. These geometrical and functional features create a vehicle in a new class of vehicular conveyance, irrespective of the vehicle configuration, purpose or power source, and irrespective of the configuration, position or number of their nontraction wheels.

Figures 1, 3:
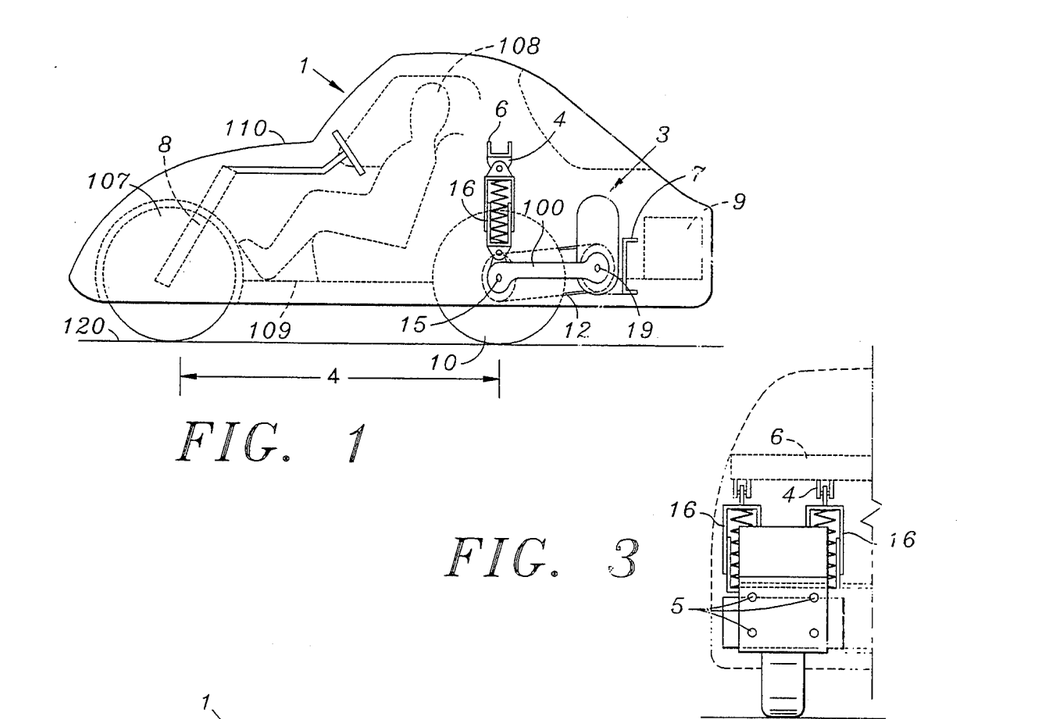
FIG. 1 is a sectional side view illustrating an electrical vehicle with the Power Traction Module at the rear end of the vehicle.
FIG. 3 is a partial sectional rear view illustrating the module in relationship to the body of the vehicle.
Figure 2:
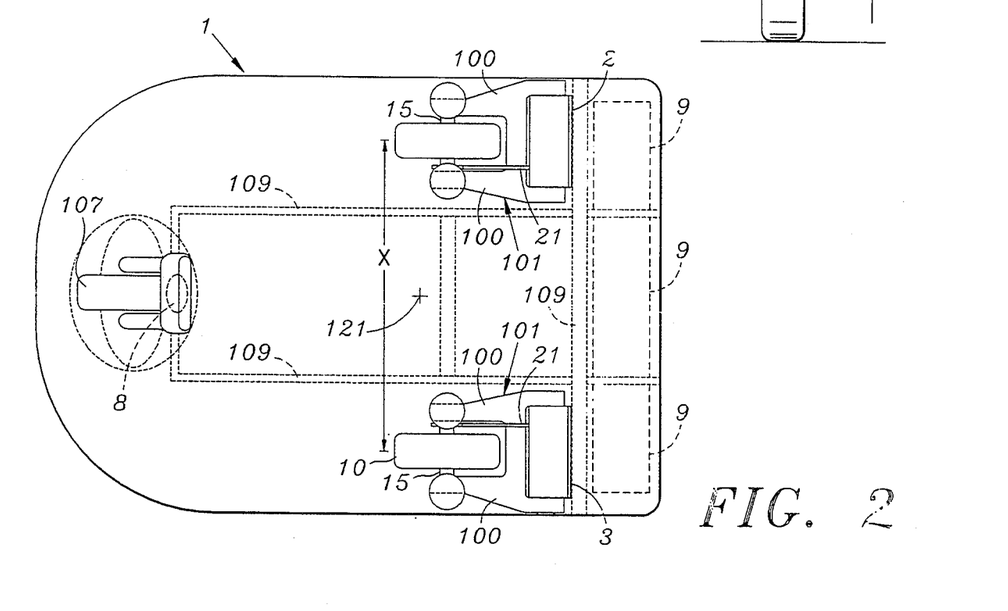
FIG. 2 is a sectional top view illustrating right and left Power Traction Modules of the vehicle of FIG. 1.

A demonstrated application of the modular vehicle is an electrical commuter and general utility vehicle shown in FIG. 1.

The vehicle 1 includes a frame or chassis 109 on which the body 110 is located. The vehicle 1 includes respectively right and left Power Traction Modules 2 and 3, each attached in at least two places with bolts 4 and screws 5 to frame members 6 and 7 being part of the overall frame 109. A non-traction, steerable front wheel assembly 8 is also attached to the frame of the vehicle 1. Space 9 in the rear of the vehicle 1 is reserved for batteries or a battery pack, a controller and other components of the electrical system which are complementary to the Power Traction Modules 2 and 3. Space is provided for three persons 108 sitting in line across the vehicle slightly in front of the center of gravity and therefore having little effect on the overall weight distribution. Power from motors in the Power Traction Modules 2 and 3 applied to the wheels 10 causes a traction force to be imparted to a road surface 120 on which the vehicle 1 moves.

Four module designs of the traction modules are shown in FIGS. 7 to 11, each module providing for different design requirements of the motor vehicle. These are: the Basic Traction Module, Reducing Traction Module, Power Traction Module and Compound Traction Module.

Figures 7, 8, 9, 10:
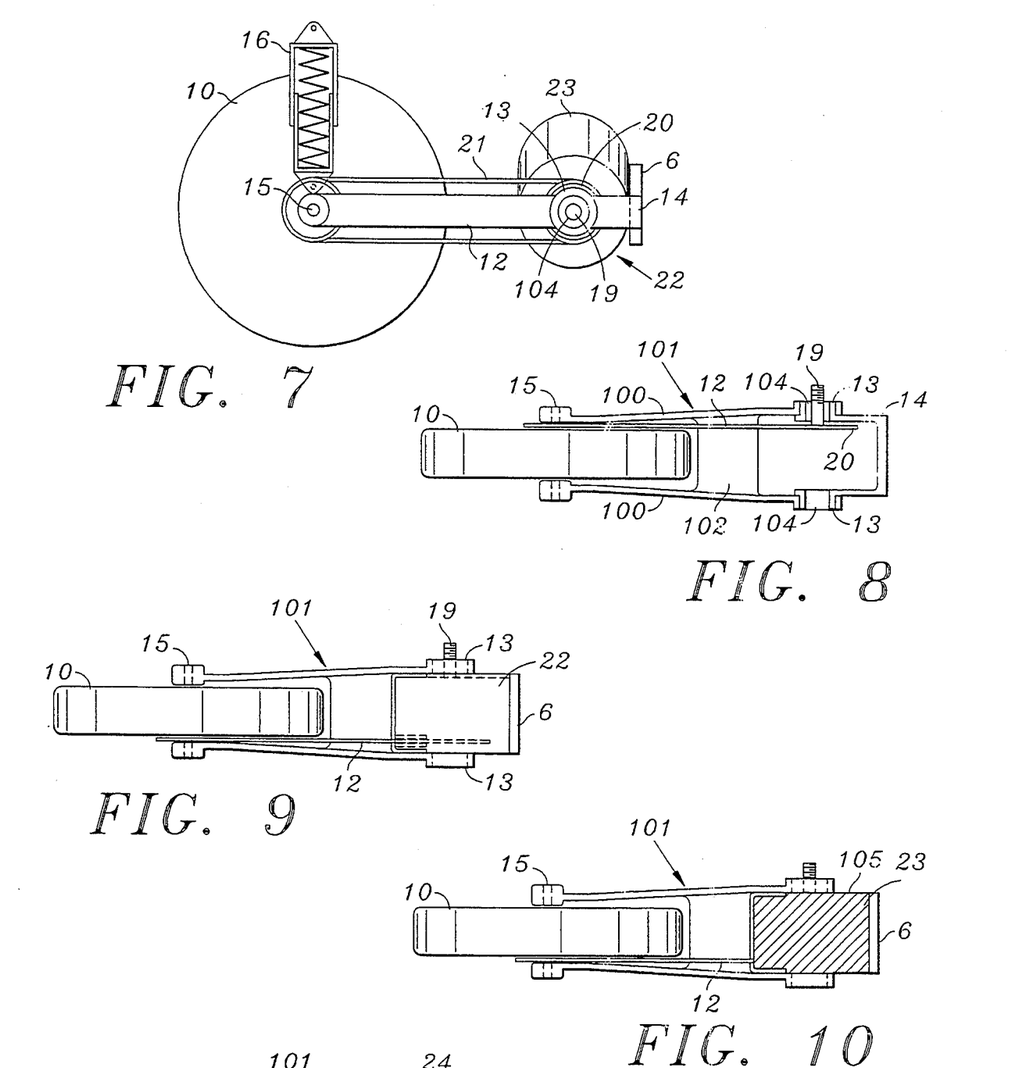
FIG. 7 illustrates a side view of the Basic Traction Module of FIG. 8, also showing the outlines of the consecutive additions to this module, namely the gearbox 22 which pertains to the Reducing Traction Module shown in FIG. 9, and the outline of the electric motor 23 which pertains to the Power Traction Module and Compound Traction Module shown respectively in FIGS. 10 and 11.
FIG. 8 is a top view of the Basic Traction Module illustrated in FIG. 7 in a first embodiment.
FIG. 9 is a top view of the Reducing Traction Module of a second embodiment of the traction module illustrated from the top, the traction module including a gear box.
FIG. 10 is a top view of the Power Traction Module of a different embodiment of the traction module viewed from the top, the module including an electric motor and gear box.

The Basic Traction Module is illustrated in FIGS. 7 and 8, and consist of a traction wheel 10 with a chain sprocket 12 supported between two arms 100 of an H-shaped horizontal bracket 101 pivoted in the bearings 13 in the housing 14 to be attached to the frame of the vehicle. Two vertical telescopic spring suspension assemblies 16 straddle the wheel 10, supporting the bulk of the weight of the vehicle, flexibly putting the vehicle load on the axles 15 of wheels 10. Concentric with the pivot bearings 13 is the shaft 19 with the sprocket 20 which, on one side of the wheel 10, provides a chain drive 21 similar to drives used in motorcycles.

The shaft 19 is driven by an internal combustion engine or an electric motor which is located in the body of the vehicle. The shaft 19 rotates in shaft bearings 104 located within the pivot bearings 13.

The traction wheel 10 is driven by a chain drive or other means such as a shaft and is held between two 100 arms of a bracket 101. At the other end, the bracket 101 is pivotally mounted with respect to the frame of the vehicle. The traction wheel 10 can swing up and down in a pivotal vertical plane.

Figure 12:
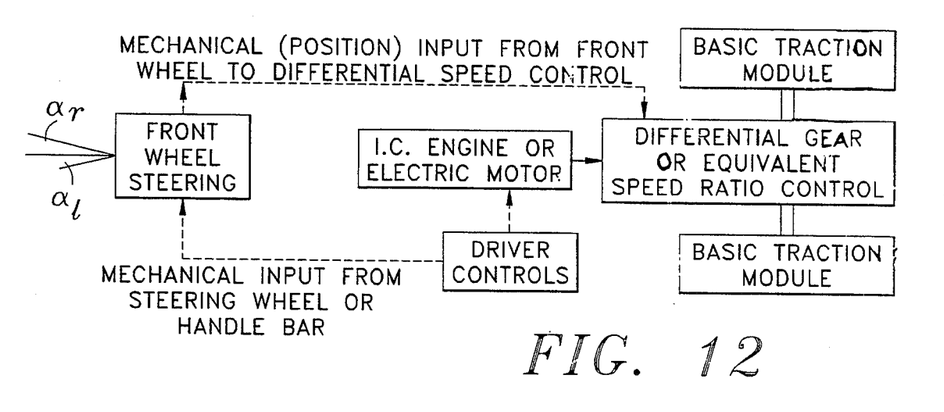
FIG. 12 is a block diagram illustrating the major components of a vehicle using an internal combustion engine or an electric motor in conjunction with the Basic Traction Module.

The Basic Traction Modules as illustrated in FIGS. 7 and 8 can be used in the vehicle driven by the I.C. engine or electric motor in the system illustrated in the block diagram of FIG. 12.

The Reducing Traction Module is illustrated in FIG. 9. It is essentially the same as the Basic Traction Module with an added speed reducing gearbox 22 which has an output shaft 19 concentric with the pivot bearings 13 and the chain sprocket mounted on the output shaft 19. The Reducing Traction Module can also be used in the system illustrated in the block diagram of FIG. 12.

The Power Traction Module is illustrated in FIG. 10 and is used in the electrical vehicle shown in FIG. 1 designated as module 2 and 3. It is essentially the same as the Basic Traction Module but includes an integral electric motor 23 with the associated speed-reducing gearbox installed to retain concentricity with the pivot bearings 13. For compactness and clarity of illustration, the pivot bearings 13 in FIGS. 1 and 10 are shown as an integral part of the gear-motor housing. An electric input cable 105 is shown entering the motor.

Figure 11:
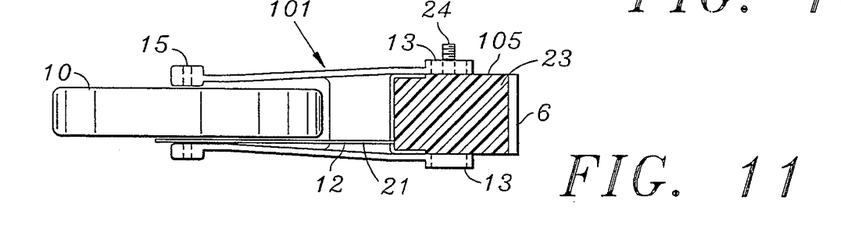
FIG. 11 is a top view of the Compound Traction Module of a different embodiment of the traction module illustrating an additional input-output shaft optionally accessible to an energy recycling system or to a secondary power source.

A Compound Traction Module is illustrated in FIG. 11. It includes a Power Traction Module with a modified gearbox with shaft 24 concentric with the module pivot. The shaft 24 provides for the input or output of power in an optional energy storage and recycling system for the module, or for the addition of extra power from an auxiliary power source in hybrid vehicles. Optional access for the mechanical or electric controls for a multi-speed or a freewheel drive module is also provided. As the motor 23 is also contained within the structure between pivot bearings 13, recycling of power is effected in a situation where a vehicle, when braking or traversing a downhill grade, can electrically regenerate power into the motive means for possible storage in the battery pack for the vehicle. Shaft 24 also allows installation of alternative means for energy storage or addition of power from a secondary source.

Steering of the modular vehicle is accomplished by controlling the speed ratio between the two traction wheels. The supporting or non-traction wheel at the front of the vehicle may be left free to swivel and self-adjust to the direction of desired movement. Alternatively the front wheel can be steerable in which case its directional orientation must be coordinated to be compatible with the speed ratio of the traction wheels 10 to produce the same turning radius. In vehicle 1 demonstrated in FIG. 1, the front wheel 107 is steerable.

In some cases a non-traction wheel can be provided at the rear and the traction wheels at the front of the vehicle. It is also possible to have only one of the pair of wheels under traction, while the other is in a state of non-traction. This can be suitably controlled.

Figure 13:
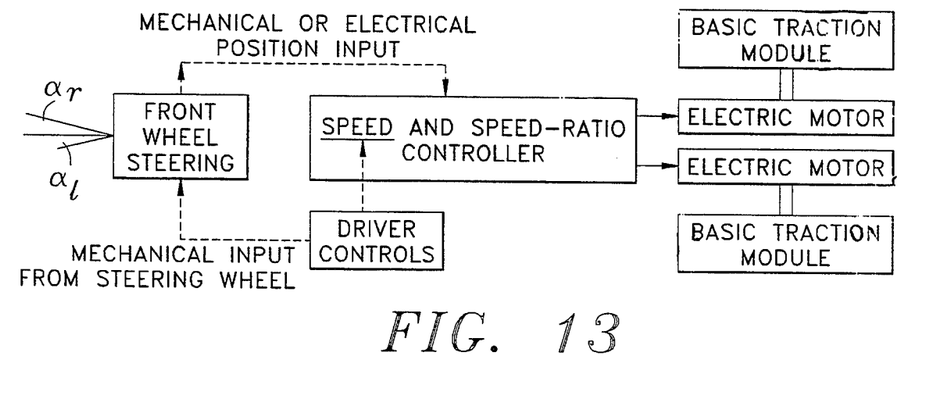
FIG. 13 is a block diagram illustrating the major components of an electrical vehicle with two electric motors using the Basic Traction Module.
Figure 14:
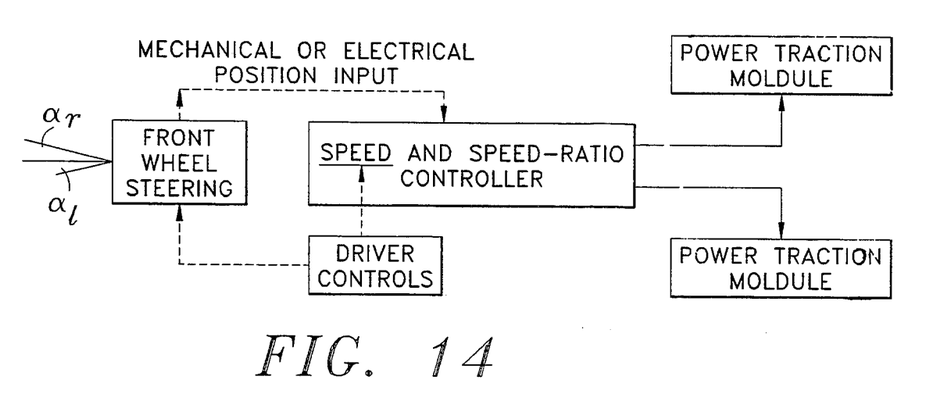
FIG. 14 is a block diagram illustrating the major components of an electrical vehicle using the Power Traction Module in a preferred form of the electric vehicle illustrated in FIG. 1.

FIGS. 12, 13 and 14 show respectively three different steering systems applicable in the modular vehicle with the front wheel steering providing for different design requirements.

In FIG. 12, there is a system for a vehicle using an internal combustion engine or one electric motor together with a differential control operative for each Basic Traction Module. A differential gear or equivalent speed ratio control device is operable between the two modules and the engine or motor located in the body of the vehicle. In FIG. 13 there is a system for vehicles using two electric motors with two Basic Traction Modules, one motor for each module. In FIG. 14, there is a system for vehicles using Power Traction Module or Compound Traction Module of FIGS. 10 and 11.

In all these cases, there is a speed ratio controller between the traction modules for each of the traction wheels. Such controller coordinates the ratio of the revolutions per minute (rpm) of the left and right traction wheel with the steering angle $\alpha$ of the front wheel in such manner that both steering means produce the same turning radius R. This relationship is also affected by the length y of the wheel base and the span x between the traction wheels across the vehicle (see FIG. 1) and is expressed by the following formula:

$$R = \frac{x}{\frac{(rpm)''}{(rpm)'} - 1} = y \cdot ctg\alpha - \frac{x}{2}$$

where R designates the turning radius, while the higher speed (rpm)'' of one traction wheel makes the vehicle turn to the side of the wheel driven at lower speed (rpm)'.

This redundancy of steering provides good mobility, ability to hold the road and safe driving on slippery surfaces. For less stringent steering requirements, the steering of only one of wheel 107 or wheels 10 may be used.

For more steerability which may be required in some special vehicles, two steerable non-traction wheels can be used. There is a front wheel and rear wheel arranged in a "diamond" configuration with two traction wheels 10 on the sides.

Different steering characteristics can be provided either by conventional front wheel steering, or differential speed control of the driven wheels or a combination of these two coordinated by a controller.

In the illustrated arrangement the compartment means for accommodating the passengers load is located ahead or forwardly of the center of gravity 121 of the vehicle 1. The rear driven wheels 10 are located rearwardly of the center of gravity 121 in optimum position to carry the bulk of the vehicle weight and maintain stable longitudinal balance.

Figures 4, 6:
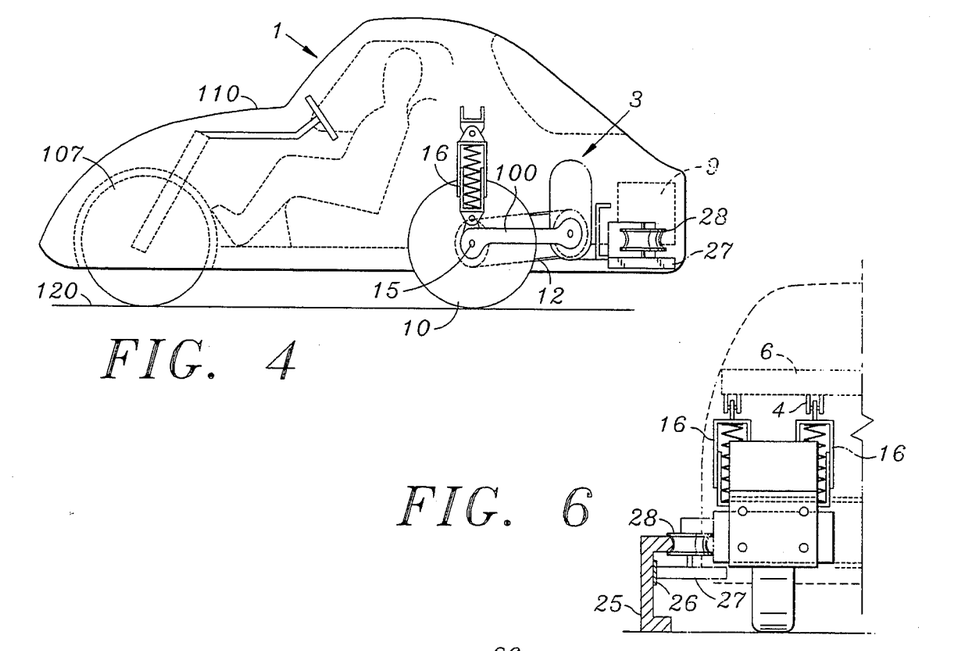
FIG. 4 is a second embodiment of the electrical vehicle illustrating the traction module in relationship to means for electrically transferring power between the vehicle and a rail on a roadway.
FIG. 6 is a partial sectional rear view illustrating the retractable means in engagement with the rail adjacent the vehicle.
Figure 5:
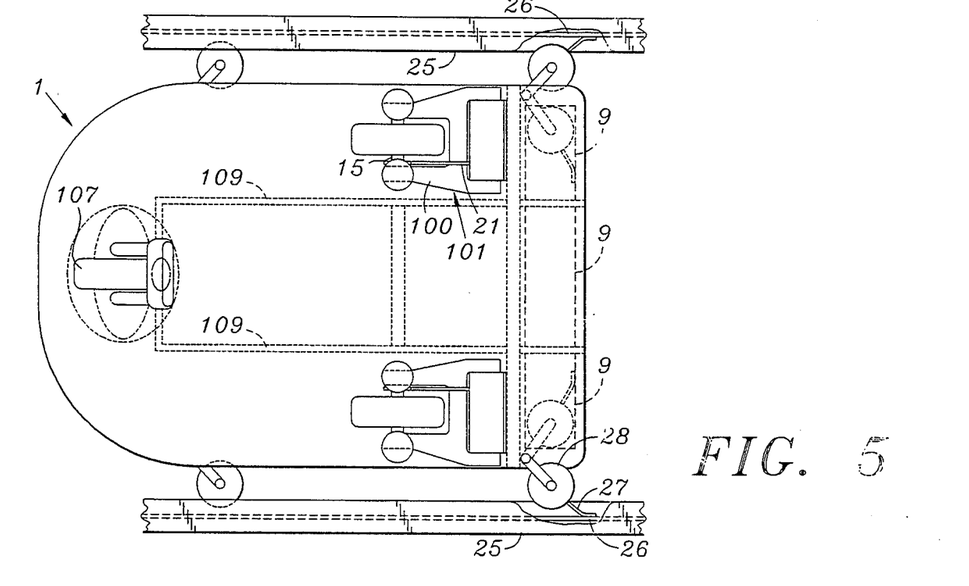
FIG. 5 is a sectional top view illustrating the vehicle with the retractable means for engaging the power carrier adjacent the vehicle.

FIGS. 4 to 6 show an adaptation of the electric vehicle 1 to use energy from either its own batteries or from an external power supply. A pair of non-conductive rails 25 housing conductive bars 26 are part of the external power supply. A retractable assembly of sliding shoe 27 and rolling guide 28 designed for high speed operation enable such vehicles 1 to enter, exit and operate along the electrified lanes of the freeway and highway system. Each vehicle 1 will have a meter which records the energy used for driving and charging. In some cases, the rail is below the road surface and the vehicle is adaptable to such system.

Figure 18:
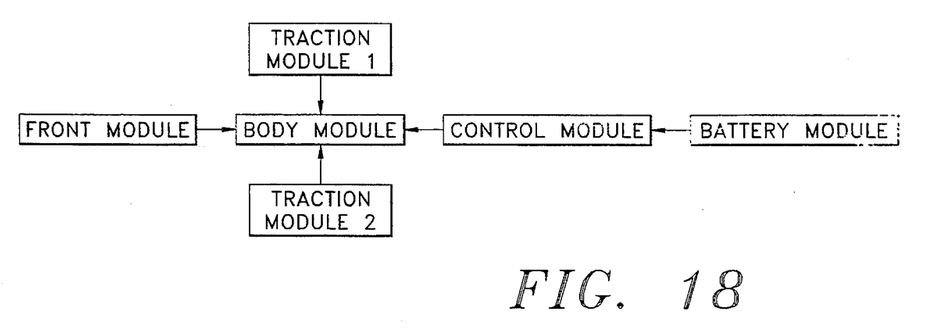
FIG. 18 is a block diagram illustrating the different independent and interacting modules for the motor vehicle.

In FIG. 18, the modular format of the motor vehicle is illustrated. The front module includes the steering features. These are the front wheel assembly including suspension, springs and brakes. Also, there is a transducer for relaying angular wheel position to the controller and mechanical means for transferring movement of the driver's steering wheel to the front wheel. Each of the traction modules 1 and 2 include a traction wheel with sprocket, a chain drive, gearbox with a sprocket and input-output shaft for secondary power or energy recycling. There is an electric motor, pivoted bracket supporting traction wheel, two suspension spring assemblies, brakes, and mounting provisions. The feature of having the vehicle set up in this modular format is a unique construction and configuration of a vehicle with enhanced characteristics.

Figure 15:
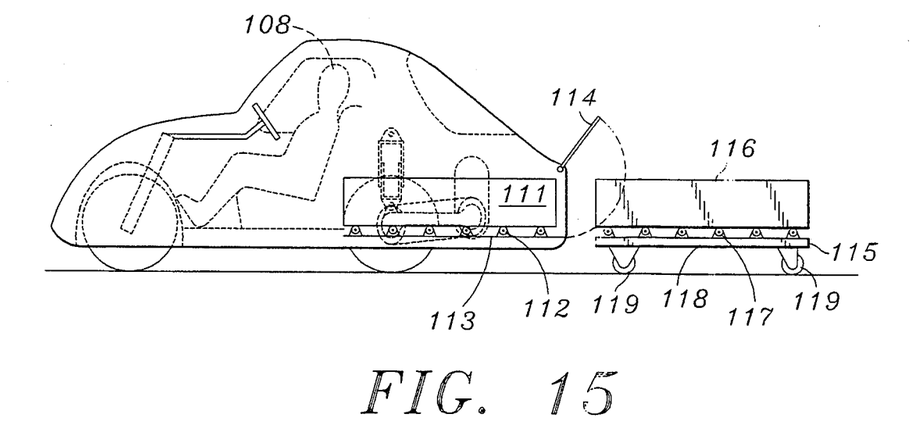
FIG. 15 is a side view of an electric vehicle illustrating a optional movable battery pack location in the rear of the vehicle of FIG. 1.

As illustrated in FIG. 15, there is a characteristic whereby a battery pack 111 is located in the rear of the vehicle 1 between the Power Traction Modules 2 and 3. It extends up to about midway in the vehicle length or slightly forward of the position of the wheels 10. The passengers 108 are located ahead of the battery pack 111.

The pack is slidably mounted on roller means 112 which fits in the rear on the base 113 of the vehicle. A tailgate 114 closes the rear portion of the vehicle through which the battery pack 111 can be removed on the slidable rollers 112. The rollers 112 can be powered or free-rolling as required.

Figure 16:
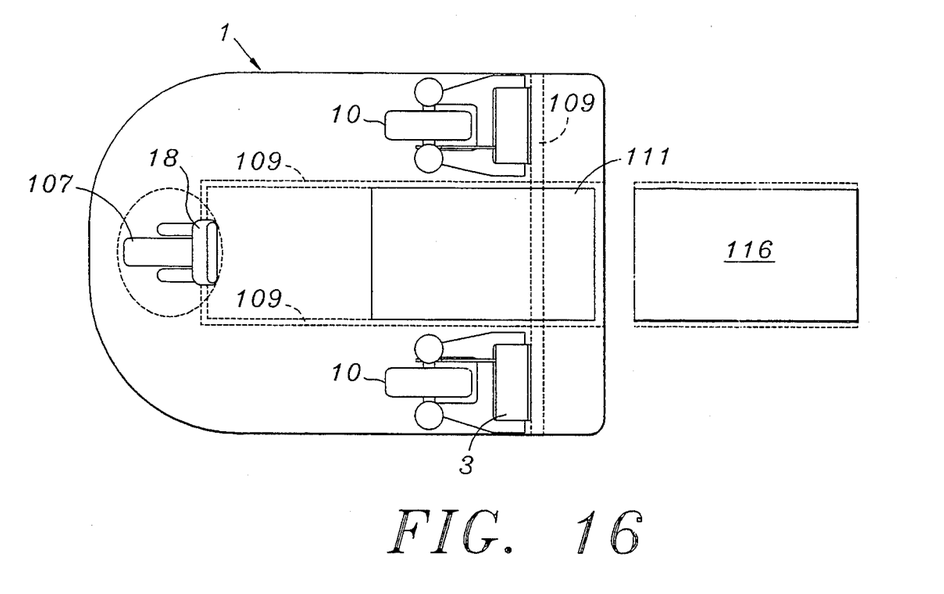
FIG. 16 is a top view of an electric vehicle illustrated in FIG. 15 with a battery pack located adjacent the vehicle.

The pack 111 can be slid onto a cart 115 which is brought into adjacency with the rear of the vehicle. A battery pack 116 which is shown on rollers 117 on the base 118 of the cart. The cart itself has wheels 119 by which it is brought into adjacency or removed from the vehicle 1 as required. In this manner, a battery pack can be removed from the vehicle and be replaced with a recharged battery pack 116 as required.

Many other forms of the invention exist each differing from others in matters of detail only.

For instance, instead of a single wheel 107 in the front of the vehicle, it is possible to have a pair of front wheels 107 as conventional in a typical four-wheeled vehicle. Alternatively, an additional wheel centrally located to the rear of wheels 10 can be provided. The vehicle can have additional space provided for carrying loads in addition to passenger 108. There can also be space for additional passengers as required.

Other variations of the invention, the traction wheels can be provided in the front of the vehicle 1. Similarly, the battery pack 111 can also be located in different locations, including the front of the vehicle. In other words, the geometry and arrangement of the traction wheel, battery pack and steering can be rearranged relative to the load carrying compartments as required.

Figure 17A:
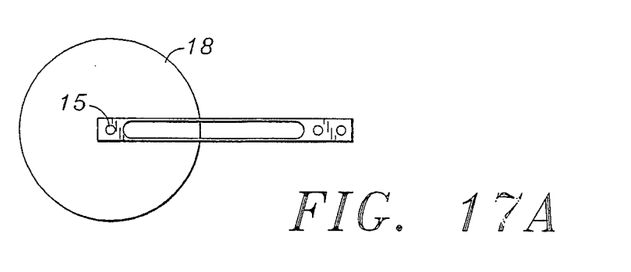
FIG. 17A is an arrangement with a flexible mechanical link.
Figure 17B:
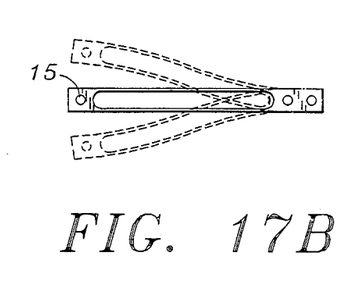
FIG. 17B shows the resilient link during use.

Although the invention has been described with regard to a rigid mechanical link, embodiments can arise where the link is flexible. This has been illustrated in FIG. 17A where a flexible mechanical link has been illustrated and where, in FIG. 17B (shown in phantom lines), different positions of the link are illustrated. There is no pivoting about at least one of the motive means or the driven wheel, but is flexibly movable about the supports with the driven wheel and/or the motive means.

The invention is to be determined solely in terms of the scope of the following claims.

I claim:

1. A motor vehicle comprising:
   (a) a frame and means on the frame for accommodating a load;
   (b) at least three wheels supported by the frame including a pair of driven wheels, the driven wheels being selectively rear wheels of the vehicle, and wherein there is at least one forward wheel for the vehicle;
   (c) electrical motive means for driving at least two of the wheels as the driven wheels, the motive means including an electrical motor located selectively adjacent to or integrally with the motive means;
   (d) the motive means being connected to the driven wheels so as to permit relative pivotal movement between the driven wheels and the respective motive means;
   (e) the connection including a mechanical link between the motive means and the respective driven wheels, the mechanical link being mounted relative to the motive means and mounted relative to the respective driven wheel such that as the driven wheel moves relatively vertically, the link moves about a mounting with the motive means and a mounting with the driven wheel;
   (f) drive means for transmitting power between the motive means and each driven wheel whereby the driven wheels apply a traction force to a surface on which the vehicle moves; and
   (g) a single speed activating means for regulating both the driven wheels, and steering means for a forward wheel, both the speed activating means and steering means being selectively separately operable by a passenger in the vehicle, the speed-activating means and steering means generating respective inputs to regulate a speed controller means, and wherein the relative speeds of the driven wheels regulates effective steering of the vehicle.

2. A vehicle as claimed in claim 1 including suspension means, the suspension means being connected between the link and the frame, the suspension means being vertically directed adjacent each driven wheel.

3. A vehicle as claimed in claim 2 including a pair of suspension means connected laterally to either side of the driven wheel.

4. A vehicle as claimed in claim 1 wherein the means for accommodating a load is a passenger compartment, the passenger compartment being located substantially forwardly ahead of the center of gravity of the vehicle, and wherein rear wheels, being the driven wheels are located rearwardly of the center of gravity.

5. A vehicle as claimed in claim 1 wherein the drive means includes a flexible drive, the flexible drive being selectively a chain or belt, the chain or belt being directed between the driven wheel and the motive means.

6. A vehicle as claimed in claim 1 including power storage means, the power storage means being a battery pack, the battery pack being horizontally removable relative to the frame, the horizontal removability being selectively longitudinal relative to the vehicle including means for facilitating rolling of the battery pack relative to a housing of the battery pack.

7. A vehicle as claimed in claim 6 wherein the battery pack is located between a pair of rear wheels, the battery pack being slidable rearwardly between a housing between the rear wheels and a position removed from the housing.

* * * * *